United States Patent [19]

Malani et al.

[11] Patent Number: 4,616,075

[45] Date of Patent: Oct. 7, 1986

[54] STORAGE OF GUAYULE BY DENSIFICATION

[75] Inventors: Shrikant R. Malani, Akron; Frank J. Clark, Massillon, both of Ohio

[73] Assignee: The Firestone Tire & Rubber Company, Akron, Ohio

[21] Appl. No.: 719,843

[22] Filed: Apr. 4, 1985

[51] Int. Cl.4 .......................... C08G 83/00; C08C 4/00
[52] U.S. Cl. ........................................ 528/1; 524/926; 528/490; 528/497; 528/930; 528/933
[58] Field of Search .................. 524/926; 528/1, 497, 528/490, 937, 930

[56] References Cited

U.S. PATENT DOCUMENTS

| | | | |
|---|---|---|---|
| 982,373 | 1/1911 | Lawrence | 260/816 |
| 1,159,137 | 11/1915 | Vecchini | 260/816 |
| 1,753,184 | 4/1930 | Spencer | 260/816 |
| 1,753,185 | 4/1930 | Spencer | 260/816 |
| 2,281,336 | 4/1942 | Stacom | 260/816 |
| 2,410,780 | 11/1946 | Gracia | 528/933 X |
| 2,434,412 | 1/1948 | Jones | 528/490 |
| 2,459,369 | 1/1949 | Tint et al. | 528/933 X |
| 2,665,317 | 1/1954 | Clark et al. | 528/933 X |
| 4,136,131 | 1/1979 | Buchanan | 260/816 G |
| 4,376,853 | 3/1983 | Gutierrez et al. | 528/1 |
| 4,526,959 | 7/1985 | Kay et al. | 528/933 X |
| 4,542,191 | 9/1985 | Kay et al. | 525/930 X |

Primary Examiner—Howard E. Schain
Attorney, Agent, or Firm—Daniel N. Hall

[57] ABSTRACT

A process and product thereof for densifying guayule shrubs by compression and forming a densified pellet. The densified pellet substantially maintains its molecular weight during storage over a period of weeks without the aid of any inert gas blanket or the like.

17 Claims, No Drawings

STORAGE OF GUAYULE BY DENSIFICATION

TECHNICAL FIELD

The storagability or shelf-life of raw, untreated guayule plants is significantly prolonged by compression and densification. Such material has a low molecular weight loss over a period of time.

BACKGROUND ART

U.S. Pat. No. 982,373 to Lawrence relates to an invention for separating rubber-like gum from the guayule plant by raking the plant and then placing the plant in water to soak. It is then rubbed and pressed under water as for example in a pebblemill to separate the gum. This patent does not disclose storage or the like.

U.S. Pat. No. 1,159,137 to Vecchini relates to the extraction of rubber from guayule plants by drying the plants, and then trituration by friction to a degree that all the wood, fiber and bark substances are reduced to flour while the rubber filaments, which are elastic, are glomerated into a mass of considerable size, as for example lumps. Thus, this patent does not relate to storage.

U.S. Pat. No. 1,753,184 to Spence, relates to enhancing the storage of guayule shrub by adding a stabilizing agent to stabilize the shrub and the rubber content thereof against deterioration. A stabilizing agent utilized is dimethyl-para-phenylene-diamine. The shrub is generally treated by spraying or dipping it into the stabilizing solution. This patent fails to disclose any densification or compression of the guayule plant shrub.

U.S. Pat. No. 1,753,185 to Spence is similar to the preceding patent and relates to treating the rubber in the guayule shrub either before or during extraction with a preservative or stabilizing agent. It fails to disclose compression of guayule plant shrub or formation of a densified pellet.

U.S. Pat. No. 2,281,336 to Stacom, relates to applying high pressure to guayule shrubs to crush and break open the cells therein and thereby separate rubber from the shrubs. Hence, this patent fails to disclose any densification, or formation of a pellet, as well as any storage thereof.

U.S. Pat. No. 4,136,131 to Buchanan relates to the simultaneous action of compression and shear forces to guayule plants to reduce them to a plastic mass which is then subjected to solvent extraction to obtain the rubber or rubber-like material therein. This patent does not disclose application of only compressive forces, the densification of the plant, or the production of a non-plastic pellet and storage thereof with minimum loss of the molecular weight.

DISCLOSURE OF INVENTION

It is therefore an aspect of the present invention to provide a storable guayule pellet and method of making.

It is a further aspect of the present invention to provide a storable guayule pellet and method of making, as above, wherein guayule shrubs are compressed and densified.

It is a still further aspect of the present invention to provide a storable guayule pellet and method of making, as above, wherein said guayule pellet has a low molecular weight loss over a period of time.

It is still another aspect of the present invention to provide a storable guayule pellet and method of making, as above, wherein said guayule pellets are easily transported and handled.

These and other aspects of the present invention will become apparent from the following specification which describes in detail the method of making said pellets.

In general, a process for prolonged storage of guayule by densification, comprising the steps of:
compressing a guayule plant shrub, and forming a densified pellet so that said pellet retains a substantial portion of its molecular weight over a period of time.

BEST MODE FOR CARRYING OUT THE INVENTION

Guayule shrubs are harvested in any conventional manner. Then, the resin is extracted as by crushing or grinding the harvested shrubs and extracting the rubber or resin with suitable solvents. As a practical matter however, since harvesting is seasonal, oftentimes the extraction or processing equipment cannot adequately handle the volume of guayule shrubs harvested and hence it must be stored. However, the storage time is limited in that the weight average molecular weight generally decreases about 40 percent in approximately 35 days after harvesting. Such a molecular weight reduction naturally has an adverse effect upon various properties of the rubber and/or resin when subsequently extracted.

According to the concepts of the present invention, a method is provided wherein the storage life of guayule material is greatly extended with only a low the shrub the molecular weight. Initially,or shrubs are ground as by a hammermill to obtain particle size reduction, as for example particles of approximately 1/16 to 2 inches in size although larger and sometimes smaller sizes can be utilized. The guayule material is then air classified to remove the leaves, fines, dirt, seeds as well as various other small particles. The remaining material is referred to as ground guayule material.

In order to obtain the advantages of the present invention, the ground guayule material is compressed and densified. No shear whatsoever is utilized in the compression step and the pressure can range from about 1,000 to about 40,000 pounds per linear inch and preferably from about 2,000 to about 20,000 pounds per linear inch. From a pragmatic standpoint, a pressure is utilized to obtain a desirable density. Accordingly, the density is increased from a nominal 2 pounds per gallon to anywhere from about 3 pounds to about 8.5 pounds per gallon with from about 5 pounds to about 8.5 pounds being preferred. The high density permits ease of handling, reduced storage capacity, and the like.

As exemplary of the process, the ground guayule material is added to a hopper having a feed screw at the bottom thereof. The feed screw transports the guayule material into an apparatus which compresses and densifies it. Such an apparatus can be a two roll mill having a cavity or pocket therein. As guayule material passes through the rolls, part of it is compressed and densified into the cavity. As the roll continues to turn, the formed pellet is removed by any number of methods as by automatic rejection and the like. Another apparatus involves feeding the material to the inside of a thick walled cylinder having a roll located therein. The roll proceeds in a circumferential direction within the cylinder thereby compressing and densifying the material through apertures located within the cylinder. The densified guayule material is automatically ejected and can be cut up into appropriate size length.

Regardless of the specific apparatus utilized, no solvent contact or any extraction step whatsoever is utilized. Moreover, no attempt is made during the pelletization of the guayule material to keep it from contact with oxygen or to blanket the apparatus and/or material in an inert atmosphere. The cavity or aperture size can be of any desired size and shape. Considering the size, it can range from about one-half inch to any exceedingly large size such as that of a bale of hay. A more desired size is generally a pellet of from about one (1) inch to about four (4) inches. The particular shape is not important and can be a rectangle, a cube, a sphere, a charcoal briquette shape and the like. Generally, however, a size is desired which does not easily break apart during storage or handling. The guayule pellet, due to the compression and densification, is relatively hard and non-pliable. Accordingly, upon bending, it will break or fracture since it is non-plastic or brittle.

At any point during preparation of the guayule pellets, antioxidants can be added to help stabilize the molecular weight. This aspect is optional and the antioxidants desirably can be added prior to the densification step. The amount of antioxidants can range from about 0 or 1 to about 5 parts by weight per 100 parts by weight of rubber within the guayule material with from about 2 to 3 parts being preferred. The antioxidants can be any conventional antioxidants well known to the art and literature with specific examples including monohydric hindered phenols, for example 2,6-di-t-butyl-p-cresol, available as DBPC, manufactured by Koppers, 6-t-butyl-2,4-xylenol, available as Prodox 340, manufactured by Ferro, styrenated phenol, available as Wingstay S, manufactured by Goodyear, butylated octylphenol, available as Wingstay T, manufactured by Goodyear, octadecyl B-(3,5-t-butyl-4-hydroxyphenyl)propionate, available as Iranox 1076, manufactured by Ciba-Geigy; bisphends, for example 4,4'-butylidenebis(6-t-butyl-m-cresol), available as Santo-white Powder, manufactured by Monsanto, polybutylated bisphenol A, available as Agerite Superlite, manufactured by Vanderbitt; hindered hydroquinones, for example 2,4-di-t-amylhydroquinone, available as Santovar A, manufactured by Monsanto; polyphenols, for example butylated p-cresol-dicyclopentadiene copolymer, available as Wingstay L, manufactured by Goodyear; phenolic sulfides, for example 4,4'-thiobis(6-t-butyl-3-methyl-phenol), available as Santowhite Crystals, manufactured by Monsanto; hindered phenol phosphites, for example alkylated-arylated bisphenol phosphite, available as Agerite Geltrol, manufactured by Vanderbilt, tris(nonylphenyl)phosphite, available as Polygard, manufactured by Uniroyal; triazinetriones, for example alkylated hydroxycinnamate triester of tris(2-hydroxyethyl)-triazinetrione, available as Agerite SKT, manufactured by Vanderbilt, tris(alkyhydroxybenzyl)-triazinetrione, available as Cyanox 1790, manufactured by American Cyanamid; pentaerythritol esters, for example tetrakis(methylene-3,5-di-t-butyl-4-hydroxyhydrocinnamate)-methane, available as Irganox 1010, manufactured by Ciba-Greigy; substituted diphenylamines, for example octylated diphenylamines, available as Agerite Stalite, manufactured by Vanderbilt, p-(p-touenesulfonamido)-di-phenylamine, available as Aranox, manufactured by Uniroyal, nonylated diphenylamine, available as Polite, manufactured by Uniroyal, diisobutylene-diphenylamine reaction product, available ast Octamine, manufactured by Uniroyal; dihydroquinolines, for example 6-dodecyl-1,2-dihydro-2,2,4-trimethylquinoline, available as Santoflex DD, manufactured by Monsanto; dihydroquinoline polymers, for example 1,2-dihydro-2,2,4-trimethylquinoline polymer, available as Agerite Resin D, manufactured by Vanderbilt, mercaptobenz-imidazoles, for example 2-mercaptobenzimidazole, available as Naugard MB, manufactured by Uniroyal; metal dithiocarbamates, for example nickel dibutyldithiocarbamate, available as Naugard NBC, manufactured by Uniroyal, nickel diisobutyldithiocarbamate, available as Isobutyl Niclate, manufactured by Vanderbilt, nickel dimethyldithiocarbamate, available as Methyl Niclate, manufactured by Vanderbilt; ketone/aldehyde-arylamine reaction products, for example aniline-butyraldehyde condensation products, available as Antox Special, manufactured by DuPont, diarylamine-ketone-aldehyde reaction products, available as BXA, manufactured by Uniroyal; substituted p-phenylenediamines, for example di-b-naphthyl-p-phenylenephenylenediamine, available as Agerite White, manufactured by Vanderbilt, N-phenyl-N'-cyclohexyl-p-phenylenediamine, available as Flexzone GH, manufactured by Uniroyal; N-(1,3-dimethylbutyl)-N'-phenyl-p-phenylenediamine, available as Santoflex 13, manufactured by Monsanto.

Heretofore, crushed guayule particles if left untreated and stored, would have a drop-off of the average molecular weight of approximately 40% weight of its original value in approximately two weeks. In comparison, the present invention results in a low drop-off such that about 70 or 80 percent or more of the original averages molecular weight is maintained and preferably 90 percent or greater of the original molecular average molecular weight is maintained over a period of two (2) weeks.

Pelletization of the guayule material according to the present invention significantly reduces the oxygen diffusion into the pellets and, thus, protects the rubber from oxygen degradation. The pellets in having increased bulk density require less storage space. Pelletized material is more easily handled as well as transported. Not only is mold formation retarded but there is no need to store under water, solvents, or under an inert gas blanket.

The invention will be better understood by reference to the following examples.

EXAMPLE 1

Shrub Grinding Preparation Step

Whole shrub guayule plants including roots, stems, and leaves are introduced into a hammermill. Swinging hammers repeatedly strike the shrub material and pulverize it until it will pass through a heavy steel screen, which is perforated to give the degree of fineness desired. Screen size openings have been used from 1/16 inch to 2 inches. A ½ inch opening has gives a desirable feed material for further processing.

This hammer-milled material is then processed by briquetting. The addition of an antioxidant is optional at this point. The milled material is poured into a feed hopper. A screw feeder transports shrub from the bottom of the hopper to the nip area of the briquettor's compression rolls. Rolls can be pocketed, smooth, corrugated, or a combination of these. The opening between the rolls is set with spacers and maintained hydraulically. Hydraulic pressure can be set from 0–20 tons per linear inch. Roll width of 1 inch and hydraulic pressure of 5 tons gives a force of 10,000 lb. per linear inch pressure applied to the material.

EXAMPLE 2

Briquettes with Antioxidant

Twenty-four pounds of ½ inch nominal size ground guayule shrub was spray treated with 40 grams of Santoflex-13 antiozonant in solution with acetone. The antiozonant treated shrub was densified for storage testing by force feeding it into the nip area of the briquetting equipment using a decreasing pitch screw feeder mechanism. Side cheek plates direct all material between the rolls. The material was fed through the screw into a 0.053 inch nip opening between a smooth and a pocketed roll. Hydraulic pressure applied to the rolls was 5 tons per linear inch. Roll speeds were maintained at 50 RPM. The resulting briquette had a bulk density of 8.4 lb./gal.

Samples were taken of the loose feed material as a control and of the densified product produced under the above conditions. These samples were allowed to "age" at ambient conditions in open containers. Periodic GPC testing of weight average Molecular Weight gave the following results:

|  | No. of Days Aged | | |
| --- | --- | --- | --- |
|  | 0 | 57 | 76 |
| Loose M.W. × $10^6$ (control) | 1.49 | .95 | .64 |
| Dense M.W. × $10^6$ | 1.49 | 1.1 | 1.1 |

EXAMPLE 3

Briquettes without Antioxidant

Forty pounds of ½ inch nominal size ground guayule shrub was densified for storage by force feeding from a hopper into the nip area of the briquetting equipment using a decreasing pitch screw. Side cheek plates directed all material between the rolls. The material was feed through the screw into a 0.053 inch opening at the nip between a smooth and a pocket roll. Hydraulic pressure applied to the rolls was 5 tons per linear inch. Roll speeds were maintained at 50 r.p.m. The resulting bulk density of the densified material was 8.4 lb./gal.

Samples were taken of the loose feed material as a control and of the densified product produced under the above conditions. These samples were allowed to "age" at ambient conditions in open containers. Periodic GPC testing for weight average molecular weight gave the following results:

|  | No. of Days Aged | | | |
| --- | --- | --- | --- | --- |
|  | 0 | 15 | 57 | 76 |
| Loose M.W. × $10^6$ (control) | 1.49 | .49 | .52 | .26 |
| Dense M.W. × $10^6$ | 1.49 | 1.18 | .57 | .33 |

Explanation of examples:

Example 1 sets forth the procedures used in preparing the shrub for further processing. This can be densification, flaking, or extraction. This initial step is used for all of these different processes.

Example 2 sets forth the combined effects of densification and A.O. addition. From example 2, it can be seen that A.O. improves the storage life of the shrub by preserving the M.W.

Example 3 sets forth the improvement of shrub storage by densification only.

While in accordance with the patent statutes, a best mode and preferred embodiment has been discussed in detail, the scope of the invention is measured by the scope of the attached claims.

What is claimed is:

1. A process for prolonged storage of guayule by densification, comprising the steps of:
   shear free compressing ground guayule material, and forming in a cavity of densified brittle pellet having about a 50% to about a 325% increase in density so that said pellet retains at least 70% of its molecular weight during a two week period of time.

2. A process according to claim 1, wherein the density of said guayule pellet is from about 3.0 pounds to about 8.5 pounds per gallon.

3. A process according to claim 2, wherein said guayule material is compressed at a pressure of from about 1,000 to about 40,000 pounds per linear inch.

4. A process according to claim 3, wherein the density of said pellet is from about 5 to about 8.5 pounds per gallon.

5. A process according to claim 4, wherein the molecular weight retention is about 90 percent or greater based upon the the original weight average molecular weight.

6. A process according to claim 1, including adding from about 1 to about 5 parts per 100 parts by weight of rubber in said guayule material of an antioxidant.

7. A process according to claim 3, including adding from about 1 to about 5 parts per 100 parts by weight of rubber in said guayule material of an antioxidant.

8. A process according to claim 5, including adding from about 1 to about 5 parts per 100 parts by weight of rubber in said guayule material of an anitoxidant and wherein said antioxidant is selected from the group consisting of phenylene diamine, N-(1,3-dimethylbutyl)-N'-penyl-p-phenylenediamine, 2,6-di-t-butyl-p-cresol, 6-t-butyl-2,4-xylenol and combinations thereof.

9. A densified guayule pellet comprising:
   the pellet, said pellet being brittle and having a density of from about 3 pounds to about 8.5 pounds per gallon, said pellet having approximately a 70% weight average molecular weight retention based upon the original molecular weight over a two-week period of time.

10. A densified guayule pellet according to claim 9, wherein said weight average molecular weight retention is aproximately 90 percent over a two-week period, and wherein said density is from about 5.0 to about 8.5 pounds per gallon.

11. A densified guayule pellet according to claim 10, including from about 1 to about 5 parts by weight per 100 parts of rubber in said pellet of an antioxidant.

12. A densified guayule pellet according to claim 11, wherein said antioxidant is selected from the group consisting of phenylene diamine, N-(1,3-dimethyl-butyl)-N'-penyl-p-phenylenediamine, 2,6-di-t-butyl-p-cresol, 6-t-butyl-2,4-xylenol and combinations thereof.

13. A densified guayule pellet acccording to claim 9, wherein said pellet is made by shear free compressing and densifying in a cavity guayule material, said densified guayule material having at least a 50% increase in density, and wherein said density of said guayule pellet is from about 5.0 to about 8.5 pounds per gallon.

14. A densified guayule pellet according to claim 13, wherein said compression pressure is from about 1,000 to about 40,000 pounds per linear inch.

15. A densified guayule pellet according to claim 10, wherein saied pellet is made by compressing and densifying guayule material.

16. A densified guayule pellet according to claim 15, wherein said compression pressure is from 1,000 to about 40,000 pounds per linear inch.

17. A densified guayule pellet according to claim 16, including from about 1 to about 5 parts by weight per 100 parts of rubber in said pellet of an antioxidant.

* * * * *

UNITED STATES PATENT AND TRADEMARK OFFICE
CERTIFICATE OF CORRECTION

PATENT NO. : 4,616,075

DATED : October 7, 1986

INVENTOR(S) : Shrikant R. Malani and Frank J. Clark

It is certified that error appears in the above-identified patent and that said Letters Patent is hereby corrected as shown below:

Column 2, line 32, delete "the shrub"

Column 2, line 33, before "the" insert -- reduction in --.

Column 2, line 33, insert "the shrub" after "Initially".

Signed and Sealed this

Sixth Day of January, 1987

Attest:

DONALD J. QUIGG

Attesting Officer

Commissioner of Patents and Trademarks